May 15, 1951 — C. F. DUERR, JR — 2,552,542
TESTING APPARATUS FOR SPEED RESPONSIVE INSTRUMENTS, ETC.
Filed Feb. 16, 1945 — 5 Sheets-Sheet 1
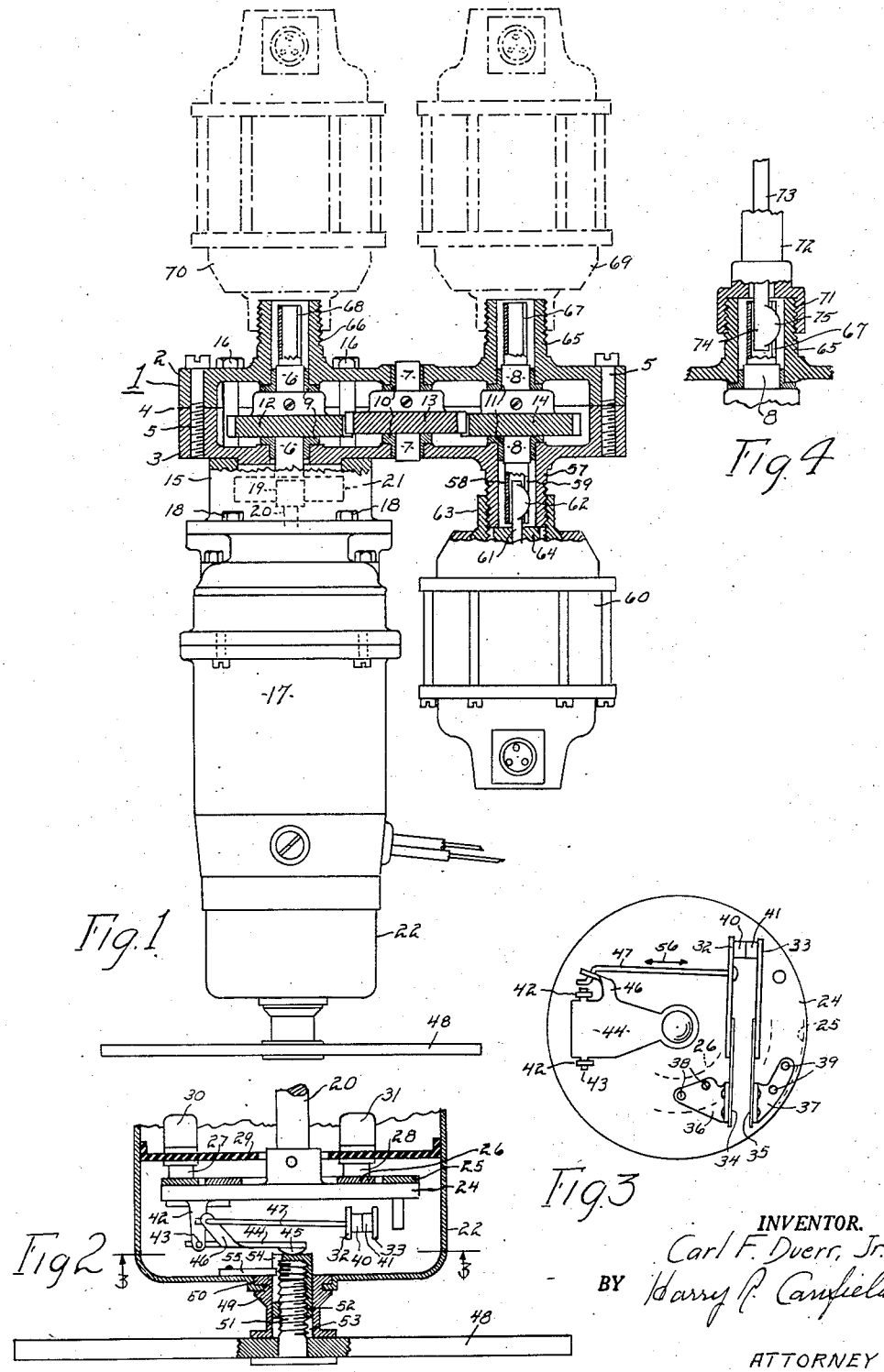
INVENTOR.
Carl F. Duerr, Jr.
BY Harry P. Canfield
ATTORNEY

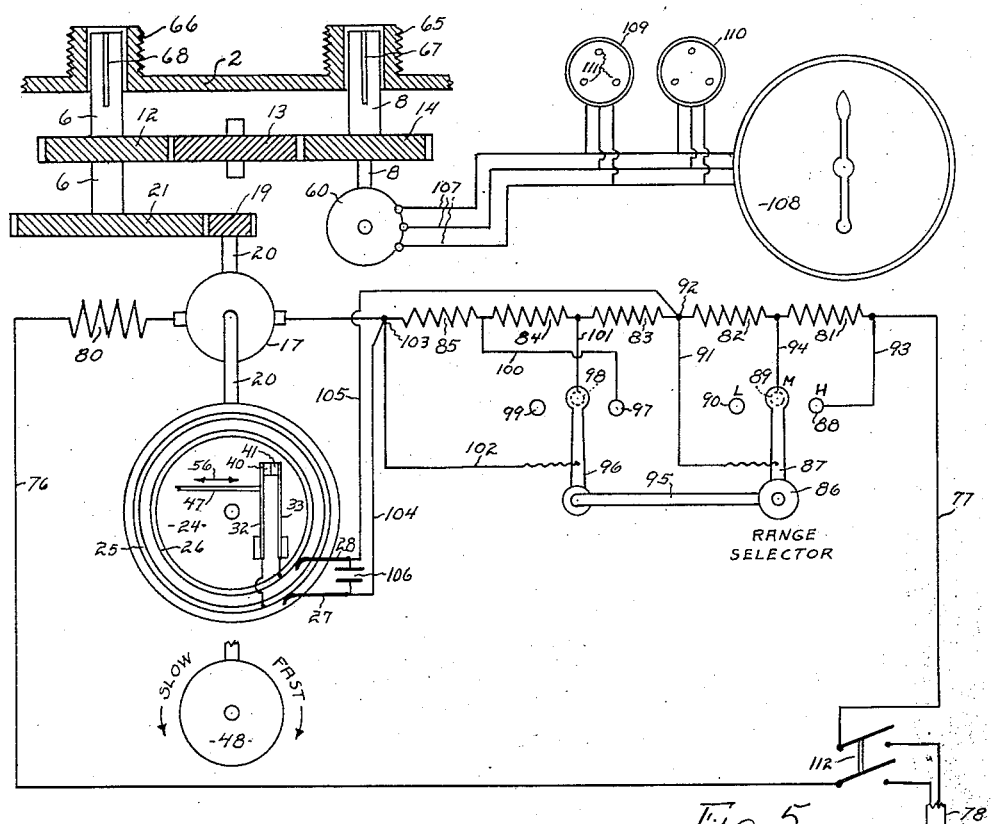

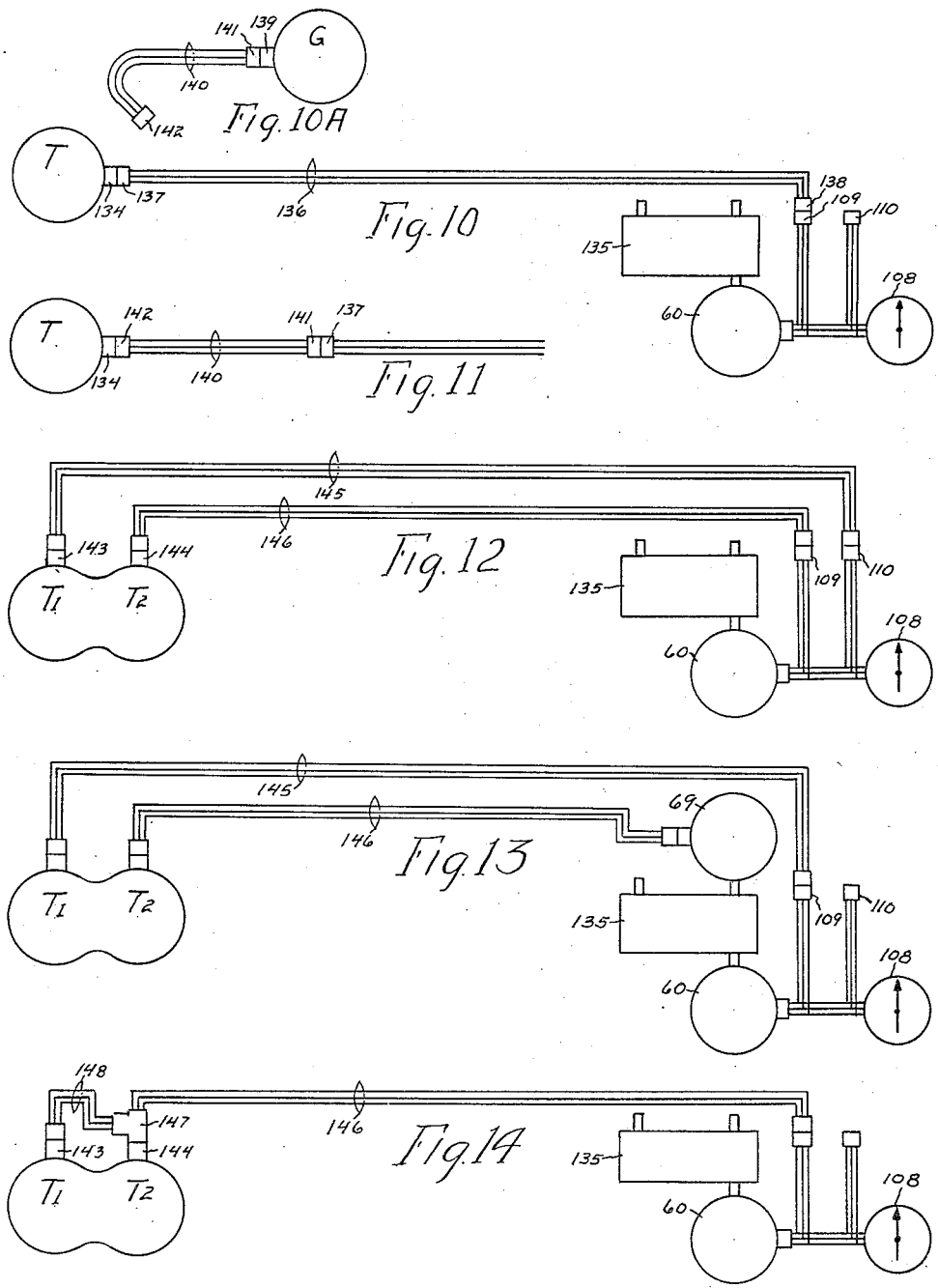

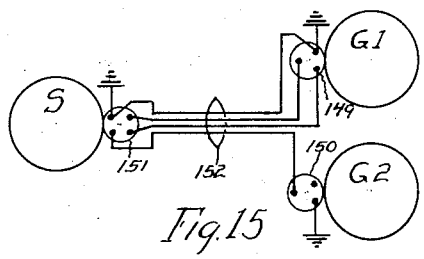
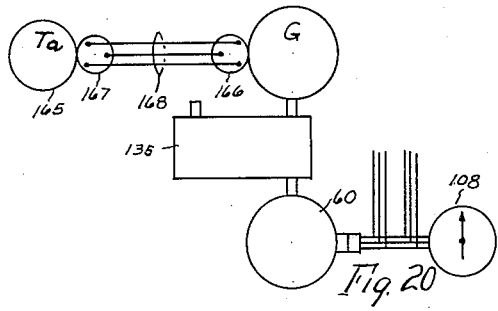
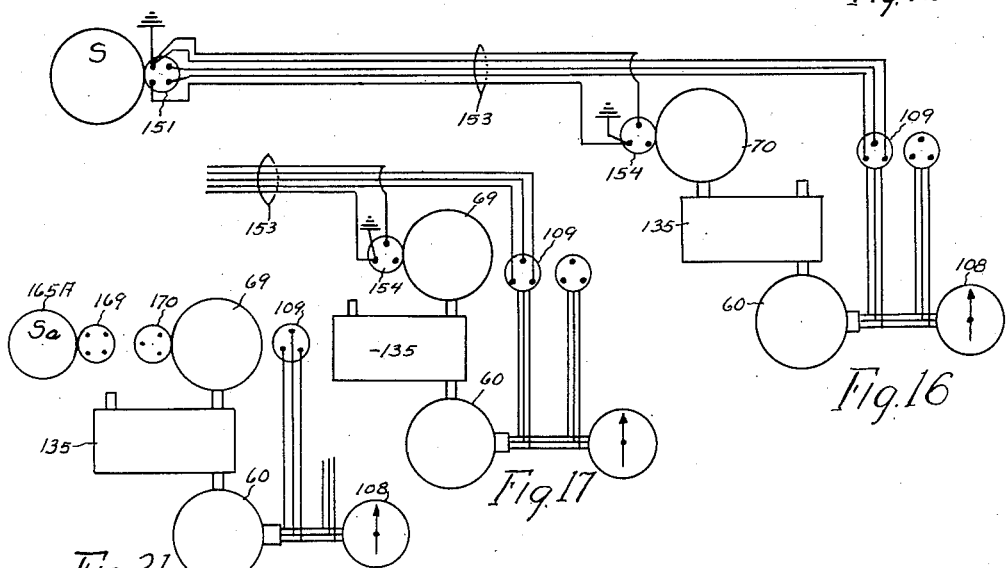
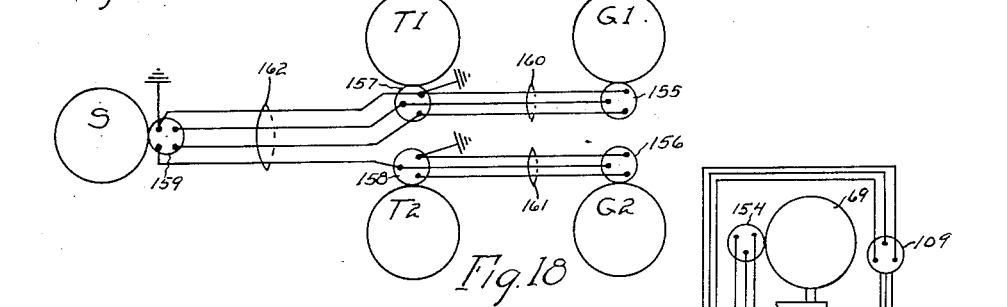
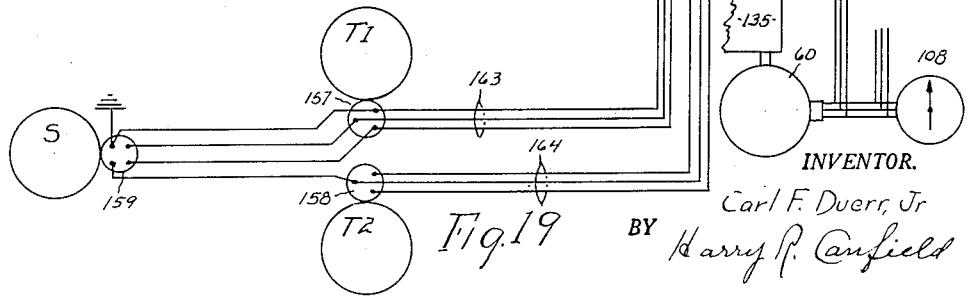
INVENTOR.
Carl F. Duerr, Jr
BY Harry R. Canfield
ATTORNEY Patented May 15, 1951

2,552,542

UNITED STATES PATENT OFFICE 2,552,542

TESTING APPARATUS FOR SPEED RESPONSIVE INSTRUMENTS, ETC.

Carl F. Duerr, Jr., Gates Mills, Ohio, assignor, by mesne assignments, of 30/100 to Ralph R. Roemer, 35/100 to Louise E. Roemer, 25/100 to William R. Kiefer, and 10/100 to J. Everette Tompkins, all of Cleveland, Ohio Application February 16, 1945, Serial No. 578,333

1 Claim. (Cl. 175—183)

This invention relates to testing apparatus for verifying the accuracy and reliability of, and for locating the causes of failure or inaccuracy of, speed indicating instruments and associated apparatus.

The invention is particularly applicable to the testing of instruments such as tachometers, synchroscope, etc., and their associated apparatus, as used to indicate the rotational speed of aircraft engines; and because of the advantages in the application of the invention to this particular use, it will be described herein as applied to this use, although it has other uses some of which will be referred to hereinafter.

Tachometers, synchroscopes, etc., as used on aircraft, are in some cases driven by one end of a torsion cable, the other end of which is driven by the engine; but more generally such instruments are electric, energized by current from a generator driven by the engine. The electric aircraft instruments are usually designed to respond to three phase alternating current supplied by a three phase generator, the frequency of the current varying with the speed of the engine; and the instrument giving indications corresponding to the frequency, independently of the potential of the currents. There are also other types of such electrc instruments which respond to the potential of single phase current.

The present invention considered as a testing apparatus, or testing set, comprises generally speaking, a motor driven power unit having both electrical and mechanical power outlets; and designed to deliver power through a torsion cable to test mechanically operated tachometers, synchroscopes, etc. on an aircraft, or, to deliver multi-phase alternating current throughout a range of frequencies, or single phase current throughout a range of potentials, to test electrically responsive tachometers, synchroscopes, etc.; or to supply power to drive and test the instrument generator of an aircraft throughout its range of speeds; and comprises an electric harness or cable construction for facilitating the making, universally, of electrical connections between the testing apparatus and instruments on the aircraft, or between the aircraft instrument generator and electrical instruments; etc.

While such apparatus as above referred to, embodies the present invention, the invention itself is that which is more particularly pointed out in the appended claims.

It is among the objects of the invention:

To provide, generally, an improved testing apparatus of the class referred to;

To provide an improved, variable speed power supplying unit for delivering at adjustably variable constant rate, either electrical or mechanical power for testing aircraft apparatus;

To provide improved means for adjusting the speed of a variable speed universal motor, and for controlling its speed to constancy at each adjustment;

To provide an improved testing apparatus for supplying mechanical or electrical testing power at two different rates differing by a predetermined difference;

To provide an improved power unit comprising an adjustably variable speed electric motor to supply power for aircraft apparatus testing purposes, and a governor to maintain the speed within a small range of variation at each speed adjustment, and improved means for maintaining the range of variation at a minimum;

To provide a testing apparatus of the type that supplies electric current at variable frequency for aircraft apparatus testing purposes, and an improved construction of electric conducting harness for making universal test connections between the testing and tested apparatus.

Other objects will be apparent to those skilled in the art to which my invention appertains.

My invention is fully disclosed in the following description taken in connection with the accompanying drawing, in which:

Fig. 1 is a view partly in section of a power unit embodying part of the invention;

Fig. 2 is a sectional view to a larger scale of a centrifugal governor constituting part of the power unit of Fig. 1;

Fig. 3 is a view taken from the plane 3—3 of Fig. 2 with a housing element of Fig. 2 omitted;

Fig. 4 is a fragmentary view of a part of Fig. 1 showing a tachometer cable mounted thereon;

Fig. 5 is a diagrammatic view of a part of the power unit of Fig. 1, showing certain electric circuits associated with and constituting part thereof;

Fig. 6 is a view similar to a part of the electric circuits of Fig. 5 but illustrating a modification;

Fig. 7 is another view descriptively similar to Fig. 6 but showing another modification;

Figure 8:
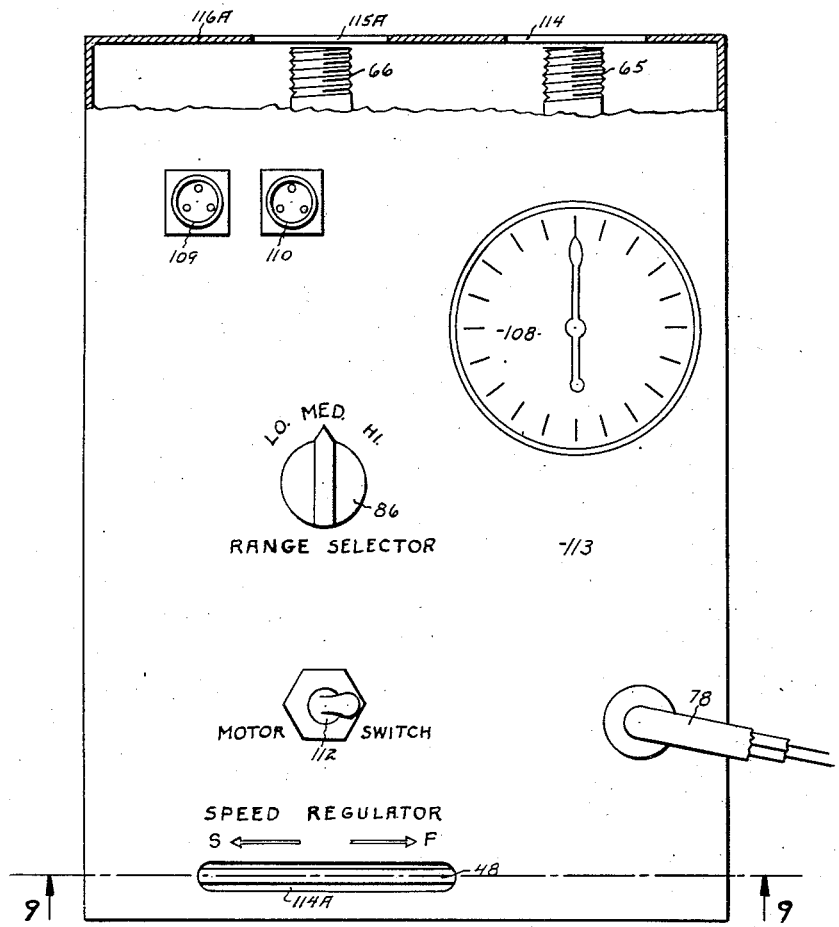
Fig. 8 is a plan view of a box or container for the testing apparatus of the preceding figures with parts in broken section, and showing a cover or control panel as the cover thereof.

Figs. 10 to 21 inclusive are diagrammatic views illustrating the making of tests or aircraft tachometers, synchroscopes and generators with the testing apparatus of the preceding figures;

One of the important features of this invention is an improved power unit which will now be described in connection with Figs. 1 to 4 inclusive.

At 1 is shown generally a transmission housing preferably made as a casting in two parts 2 and 3 juxtaposed along a common plane 4, and secured together by bolts 5—5. Three parallel shafts 6, 7, and 8 are mounted in pairs of bearings respectively 9—9, 10—10, and 11—11, supported on the transmission housing, and these shafts have connected thereto respectively gears 12, 13, and 14, the gear 13 being an idler gear interconnecting the gears 12 and 14.

A reduction gear housing 15 is bolted to the transmission housing 1 for example by bolts 16—16; and an electric motor 17 is bolted to the reduction gear housing 15 for example by bolts 18—18. A pinion 19 on the motor shaft 20 drives a gear 21 on the shaft 6, the pinion 19 and gear 21 being in the reduction gear housing 15, and the reduction ratio between the pinion 19 and gear 21 is preferably four to one; the gear 12, thus being driven at one fourth the speed of the motor 17. For a purpose to be described, the gear 14 driven by the gear 12 through the idler 13, is driven at somewhat lower speed than the gear 12, for example it may be driven 5% slower, which may be effected by providing the gear 12 with twenty teeth and the gear 14 with twenty-one teeth.

At the rear of the motor 17 is a governor housing 22 mounted thereon within which is an electric centrifugal governor the full operation and purpose of which will be described later, but the construction and mode of operation of which will be here given.

The motor shaft 20, Fig. 2 extends into the governor housing 22 and carries on its end a disc 24 preferably of insulating material, upon which are secured concentric collector rings 25 and 26 engaged by stationary brushes 27 and 28 supported by an insulating web 29 in the housing 22.

The brushes 27 and 28 are mounted in suitable brush holders or housings 30 and 31 which may contain springs for resiliently holding the brushes in engagement with the collector rings, and terminals for making electric connections thereto, which features are so well known in the art as not to need further illustration or description herein.

As shown in Figs. 2 and 3, a pair of electric contact arms 32 and 33 are joined to leaf springs 34 and 35 the latter being connected to plates 36 and 37 which are mounted upon the face of the insulating disc 24 by rivets 38—38 and 39—39 which rivets pass through the disc 24 and make electric connection respectively with the collector rings 26 and 25 shown in dotted line in Fig. 3. The arms 32 and 33 carry electric contacts 40 and 41 which are normally mutually engaged by the resilience of the springs 34 and 35.

Extending from the insulating disc 24 is a pair of upstanding posts 42—42 upon which is hinged at 43 an arm 44 which on its end opposite the hinge is provided with a button 45 axially aligned with the shaft 20.

Extending from one side of the arm 44 is a finger 46 bent to project toward the disc 24 and therefore inwardly of the hinge 43. Hooked into the end of the finger 46 is a rod 47 connected at the other end to the said contact arm 32.

An adjusting hand wheel 48 has a hub 49 mounted as at 50 to rotate on the housing 22, and has a screw 51 rotatable therewith. The screw is threaded in a traveling nut 52 axially aligned with the motor shaft 20 and guided in a bore 53 in the hub 49 and keyed against rotation by a keyway 54 and a key 55 on the housing projected thereinto.

When the motor 17 is running and the motor shaft 20 rotates, rotating the disc 24, the switch arms 32 and 33 both tend to move away from the rotational axis by the action of centrifugal force. The arm 32 is prevented from so moving, the force thereof acting through the rod 47, finger 46, arm 44, and button 45, and pressing the latter upon the end of the traveling nut 52, but at a predetermined speed of rotation the arm 33 will be moved away from the arm 32 and disengage the engaged contacts 40 and 41.

By rotating the hand wheel 48 and causing the nut 52 to travel on the screw 51 it will rock the arm 44 to a different position, and accordingly move the rod 47 toward the right or toward the left as viewed in Fig. 3 and as indicated by the arrow 56, moving the switch arm 32 to a different position at which the arm 33 will move and separate the contacts 40 and 41 at a different speed.

The particular governor construction here described constitutes no essential part of the present invention, such governors, in general being known, but it is described here in order that the functions which it performs in the use of the apparatus to be described may be fully disclosed and understood.

Referring to the transmission housing again there is shown integral with the housing and coaxial with the gear 14, a tubular externally threaded extension 57. The shaft 8 extends downwardly (as viewed in Fig. 1) beyond its bearing 11 into the extension 57 and as shown is itself tubular at least at its end portion at 58 which latter may be referred to as a stub shaft portion; and at one side of this tubular portion is a longitudinally extending slot or keyway 59.

At 60 is an alternating current three phase electric generator and preferably it is standard aircraft generator such as is driven by the engine of an aircraft to energize an electrically responding aircraft tachometer. At 61 is shown the rotor shaft of the generator, having thereon a key 62; and at 63 is shown a coupling nut and at 64 an abutment or stop element of the generator structure.

The generator is mounted on the extension 57 by screwing the coupling nut 63 on the extension until the end of the extension abuts firmly upon the generator abutment 64 and the shaft 61 is concurrently telescoped into the tubular shaft extension 58 and with its key 62 engaged with the keyway 59 of the shaft. The generator is thus mounted rigidly on the transmission housing to be driven by the gear 14.

At 65 and 66 are two other extensions which may be like the extension 57. The upper end of the shaft 8 as viewed in Fig. 1 extends into the extension 65 and is tubular as shown and has a keyway 67 therein; and the upper end of the shaft 6 projects into the extension 66 and is also tubular with a keyway 68 therein.

At 69 and 70 are indicated, in broken lines, electric generators which may be like that at 60, mounted upon the extensions 65 and 66, whereby their rotors may respectively be driven by the shafts 8 and 6 for purposes to be described.

Instead of the generators 69 and 70, mounted to be driven by the shafts 8 and 6, to be hereafter referred to, torsion cables may be mounted thereon to be driven by the shafts; and in Fig. 4 is shown at 71 the coupling nut of a cable casing 72 in which is carried a torsion cable 73, the cable at its lower end as viewed in the figure, terminating in a shaft 74 having a key 75 thereon. The shaft 74 is projected into the tubular end of the shaft 8 with the key 75 in the keyway 67 whereby rotation of the gear 14 and shaft 8 will rotate the cable 73. Similarly a cable may be driven by the gear 12 by mounting it on the extension 66.

When the motor 17 is energized and is running, it will drive the gear 12 at a four to one reduction in speed, and this will drive the gear 14 at a predetermined lower speed, the latter driving the generator 60 connected thereto which will deliver electric current; and at the same time either of the shafts 6 or 8 may supply mechanical power to a mechanical tachometer cable, or, may drive electric generators 69 or 70 mounted on the transmission.

An electrical system is associated with this above described power unit and the governor thereof, and it will now be described in connection with Fig. 5 which illustrates some of the parts of Figs. 1 to 4 diagrammatically.

At 17, in Fig. 5, is the electric motor, preferably a universal motor, that is one which may be driven by either alternating or direct current; and it is connected across supply mains 76 and 77 leading to a two-wire cable 78 connected to a male terminal plug 79 by which the mains may be connected to the conventional female outlet of a 110 volt system.

The motor 17 has a series field winding 80 between it and the main 76; and between the motor and the main 77 are a plurality of motor control resistors, five being shown at 81, 82, 83, 84, and 85.

At 86 is the handle of a motor speed "range selector" for moving a switch contact arm 87 to one or another of a suitable plurality of contacts, three being shown at 88, 89, and 90. A wire 91 connects the switch arm 87 to a point 92 between the resistors 82 and 83; a wire 93 connects the contact 88 to the main 77; and a wire 94 connects the contact 89 to a point between the resistors 81 and 82; and with this arrangement it will be seen that when the switch arm 87 is on the contact 90, both resistors 81 and 82 are in series with the motor 17, and that when it is on the contact 89, the resistor 82 is cut out; and that when it is on the point 88, both resistors 81 and 82 are cut out; and the purpose of this will be more fully described later.

A shaft 95 connects the range selector handle 86 with a second switch arm 96, the diagrammatically illustrated arrangement being such that when the switch arm 87 is moved to the contacts 88, 89, and 90, the switch arm 96 will correspondingly be moved to contacts 97, 98, and 99.

The contact 97 is connected by a wire 100 to a point between the resistors 84 and 85; and the point 98 is connected by a wire 101 to a point between the resistors 83 and 84. A wire 102 connects the switch arm 96 to a point 103 between the resistor 85 and the motor 17; by which arrangement, as will be seen, when the switch arm 96 is on the contact 99, the resistors 83, 84, and 85 are in the circuit of the motor, and that when the switch arm 96 is on the contact 98, only the resistor 83 is in the circuit; and when the switch arm 96 is on the contact 97, the resistors 83 and 84 are in the circuit; and the purpose of this also will be described later.

The motor shaft 20 drives the centrifugal governor described for Figs. 2 and 3 and here shown diagrammatically, the parts being numbered the same as in Figs. 2 and 3. The position of the contacts 41 may be adjustably moved by adjustably positioning the rod 47 by turning the hand wheel 48, as described for Figs. 2 and 3. Contact 41 is moved away from the contact 40 by centrifugal force upon rotation of the disc 24, and the speed of rotation at which it thus breaks contact at 40—41 is adjustable by adjusting the position of the rod 47 as referred to. The collector rings are shown at 25 and 26 to which the contact arms 32 and 33 are connected, and the stationary brushes are shown at 27 and 28.

The brush 27 is connected by a wire 104 to the above mentioned point 103; and the brush 28 is connected by a wire 105 to the point 92; and a condenser 106 bridges the brushes 27 and 28 and therefore bridges the contacts 40 and 41.

The motor shaft 20, by means of the pinion 19 drives the gear 21, and having in mind the characteristics of commercial motors and the characteristics of the load to be driven, this pinion and gear effect as mentioned a speed reduction of preferably four to one. The gear 21 drives the transmission gear 12; the gear 12 drives the idler gear 13; and this in turn drives the transmission gear 14 in the same direction as the gear 12; and, as stated, the gear 12 and the gear 14 have different numbers of teeth so that the gear 14 is driven slower than the gear 12, the speed difference being preferably 5%, and as illustrative of which the gear 12 may have twenty teeth and the gear 14 twenty-one teeth.

The gear 14 is connected by the shaft 8 to the electric generator 60 supplying three phase alternating current to supply mains 107. For reasons that will appear, the generator 60 is preferably, as stated, a generator such as has been standardized for use on aircraft to be driven by the engine and supply current to actuate an electric aircraft tachometer.

The mains 107 supply three phase alternating current to an electric tachometer master instrument 108 which is preferably a standard aircraft electric tachometer, and the mains 107 are also led to two three-phase outlets or sockets 109 and 110 which are preferably of standard construction as used on aircraft and which may have either pin type terminals or sleeve type terminals 111 with which a three wire conductor or cable can be connected.

Such a connection has heretofore been made by a corresponding sleeve type or pin type plug; but in the practice of the present invention it is preferred to utilize a patented three wire cable or harness and terminals thereof to be referred to.

The shafts 6 and 8 connected to the gears 12 and 14 are provided with the aforesaid keyways 68 ad 67 and for further illustration, a fragment 2 of the transmission housing of Fig. 1 is shown in Fig. 5.

At 112 is shown an electric switch by which current to the motor 17 may be cut on or off from the cable 78 to start or stop the motor.

Figure 9:
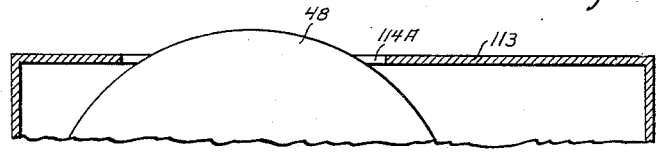
Fig. 9 is a fragmentary sectional view from the plane 9—9 of Fig. 8.

The diagrammatically illustrated parts of Fig. 5 as well as the actual structure of some of them as shown in Fig. 1, are preferably in practice, all assembled and mounted within a box-like structure of carrying case, as illustrated in Figs. 8 and 9, the top cover of which functions as an instrument panel 113. The motor switch 112, the speed range selector handle 86, the speed regulator hand wheel 48, cable 78, master tachometer instrument 108, outlet sockets 109, and 110, are all shown as mounted on the panel. The rest of the apparatus and the electrical parts and connections thereto are housed under the panel and in the box; and at the upper part of Fig. 8 the panel is broken away to show the two housing extensions 65 and 66 thereunder, and as being accessible through openings 114 and 115A in the end wall 116A of the box or carrying case. Fig. 9 in connection with Fig. 8 shows the upper edge of the speed regulator hand wheel 48 as projecting slightly above the panel 113 through a slot-like opening 114A in the panel whereby its periphery is accessible for turning it manually.

In the general operation of the apparatus of Figs. 1 to 9 when the plug 79 has been plugged into an alternating or direct current line, and the switch 112 has been closed, the motor 17 will receive current from the mains 76 and 77 and it will run and drive the gears 12 and 14 and the generator 60; and the tachometer 108 will indicate the speed of the gear 14 and generator 60. The standard tachometer or master instrument 108 indicates speeds from 500 to 4500 revolutions per minute in accordance with the speed at which the generator 60 is driven, and the speed of the motor 17 may be adjustably varied to give this range of tachometer speeds, by the following operation of the electrical system of Fig. 5, in accordance with manually effected rotated positions of the speed regulator wheel 48.

As shown in Fig. 5, the governor contacts 40—41 when closed, close a bridge or short circuit across the points 92 and 103, and therefore short out resistance between these points which may be referred to as governor resistance; and when they open, they reinsert this resistance. When the resistance is reinserted the speed of the motor is slightly reduced thereby and the contacts 40—41 again close and short out the resistance, and the motor again gains in speed until the contacts open again, and so on; so that the motor runs at an average speed determined by the position of the speed regulator wheel 48, the actual speed pulsating slightly above and below the average speed. The contacts 40 and 41 open and close rapidly and any tendency to arc in opening is suppressed by the condenser 106 in a well known manner.

Again, were it not for the resistors 81 and 82, or if in other words, the motor 17 were connected directly across the mains 76 and 77 when the points 92 and 103 were bridged by the governor contacts, then the motor would at all times be trying to attain its high maximum top speed. To adjust it to run at its lowest average speed, the opening of the governor contacts would have to insert a high value of governor resistance to keep the average speed down, and this would result in the breaking of a large current at the governor contacts, and the resulting arcing at the contacts would be irregular and destructive, and the pulsations of motor speed would be great and the needle of the master instrument would fluctuate or vibrate through a wide arc. To prevent such action, the resistors 81 and 82 which may be referred to as speed resistance, are employed to limit the top speed which the motor tries to attain, and to therefore reduce the amount of resistance between the points 92 and 103 which must be cut in and out to hold it at its adjusted speed in the lower portions of its total speed range.

It is for this reason that the range selector device 86 to 99 inclusive Fig. 5 is provided.

If we assume that the motor 17 is to be driven at low speed, the range selector handle 86 is rotated to engage the arm 87 with the contact 90 whereup both speed resistors 81 and 82 are placed in series with the motor and its top speed is made accordingly less. At the same time the switch arm 96 moves to the contact 99 so that the governor resistance which will be cut in and out by the governor between the points 92 and 103 includes all three resistors 83, 84, and 85. The speed regulator wheel 48 may now be moved to different positions to set the speed of the motor 17 at any speed within this low speed range, to drive the tachometer 108 to indicate any speed within this range.

If it be desired to drive the motor 17 at speeds within a medium range of speed, the switch arm 87 is set on the contact 89 which cuts out the resistor 82, and leaves in the resistor 81, determining a medium top speed for the motor, and concurrently the switch arm 96 moves to the contact 98 so that the governor cuts in and out only the resistor 83.

If it be desired to drive the motor 17 at high speed, a high speed range is provided by moving the switch arm 87 to the contact 88 whereby both sections 81 and 82 are cut out, giving a high top limit to the motor speed, and now the arm 96 is on the contact 97 and the governor cuts in and out the resistors 83 and 84.

It has been found by experiment that the pulsations of speed of the motor as the governor contacts open and close will be at the minimum and the arcing conditions at the optimum and the vibration of the instrument needle at the minimum if the resistance which is cut in and out by the governor resistance is about equal to the speed resistance; but for reasons of simplicity and economy, and due to the fact that there must be some governor resistance to cut in and out when (as at high speeds) there is no speed resistance, a satisfactory compromise is reached over the complete range of speeds by providing two changes of speed resistance for three changes of governor resistance, and this arrangement has been illustrated in Fig. 5 as described.

Accordingly, to operate the apparatus of Fig. 5, the operator would set the range selector handle 86 to the high, medium, or low range of speed (as indicated by the letters H, M, and L) and then in either range of speed, would move the speed regulator handle or wheel 48, and, in accordance with its position, the needle of the instrument 108 will take up a corresponding speed indicating position within that speed range; and to indicate speeds in the higher ranges the range selector handle 86 would be moved to a higher speed range position and the speed regulator wheel 48 positioned to give any desired speed indication on the instrument 108 within that higher range.

It is a particular advantage of the invention that by dividing up the governor resistance into sections and by changing the total resistance of these sections to correspond with different speed ranges of the motor, the fluctuations of the needle of the instrument 108 are reduced to a negligible amount even at the higher speeds where the tendency to vibrate is the greatest.

It has been found (referring to Fig. 5) that a $\frac{3}{16}$ horsepower universal motor 17 will serve the purposes, including tests to be made as hereinafter described. And that if the resistors 81, 82, 83, 84, and 85 have respectively the resistance values of fifteen ohms, fifteen ohms, twenty ohms, fifteen ohms, and ten ohms, a centrifugal governor as described will give a total range of motor speeds from 1,050 to 9,450 with a negligible amount of needle vibration. With a four to one speed reduction at the gears 19—21, the gear 14 having say 21 teeth, will be driven through a speed range of 249.37 to 2,244.37 revolutions per minute and will drive the standard airplane tachometer generator 60 at a speed range which will cause a standard aircraft electric tachometer instrument 108 to register a speed range of practically 500 to 4500; and the gear 12 having for example 20 teeth, will be driven correspondingly over a speed range of 262.50 to 2,362.50 revolutions per minute.

As described for Fig. 5, the motor is given ranges of speed by the cutting in or out of series, speed resistance in steps, or sections, and the resistance which the motor speed governor cuts in and out at its contacts is concurrently changed by steps or sections as the speed resistance is changed. In Fig. 6, is shown a modification in which the speed resistance and the governor controlled resistance are concurrently changed, gradually, instead of in steps.

Current to the motor 17 flows from the main 76 through the field 80 and motor 17 and thence through a resistor 115 or part of it and a resistor 116 or part of it, which resistors are bridged by a bridging contact 117; and thence the current flows by wire 118 to the main 77. The bridging contact 117 is on a rheostat arm 119 pivoted at 120, and as the arm is moved, toward the left or toward the right as viewed in the drawing, the bridging contact 117 will cut out resistance from both resistors 115 and 116, and when it is moved toward the right it will cut in more of each of these resistors concurrently.

The governor contacts 40—41 bridged by the condenser 106 as described for Fig. 5, are shown in Fig. 6 and it will be observed that the contact 41 is connected by a wire 121 to the end of the resistor 115 and the contact 40 is connected by a wire 122 to the arm 119 which arm is electrically connected to the bridging contact 117 engaging the resistors; so that as the governor contacts 40—41 open and close, they cut in and out that part of the resistor 115 which is in the circuit.

It will be seen therefore that the continuous resistor 115 corresponds to the governor resistance 83 to 85 of Fig. 5, and that the resistor 116 corresponds to the speed resistance 81 and 82 of Fig. 5; and that movement of the bridging contact 117 over both of them, concurrently changes both of them continuously or gradually or by very small steps, but otherwise in the same manner and with the same results as in Fig. 5.

The hand wheel 48 of Figs. 1 and 5, which adjusts the motor speed at which the contacts 40—41 open and close, is reproduced in Fig. 6 and rotation thereof rotates a wheel or gear 123 which drives an idler 124 which in turn drives a wheel or gear 125 to turn or move the switch arm 119 about its pivot center 120. It will be seen therefore that in this modification, rotary adjusting movements of the hand wheel 48 effect both an adjustment of speed range resistance 116, and of governor resistance 115; and that a separate speed range selecting operation by the operator as in Fig. 5 is obviated.

In some cases, when vibration of the instrument needle is damped or when it does not tend inherently to vibrate excessively, the switch arm 96 and its points 97 to 99 of Fig. 5 may be dispensed with, and the control both of the speed range resistors and the governor resistors may then be effected by the switch arm 87 and the contacts 88 to 90 only, and such arrangement is shown in the modification of Fig. 7.

Here three resistors 126, 127, and 128 are in series with the motor 17. The contact 88 is connected by a wire 129 to the line 77; the contact 89 is connected by a wire 130 to a point between resistors 126 and 127; the contact 90 is connected by a wire 131 to a point between the resistors 127 and 128; the governor contact 40 is connected by wire 132 to the arm 87; and the contact 41 is connected by a wire 133 to the end of the resistor 128. In the high speed or "H" position of the arm 87, there is no speed resistance in the motor circuit and the governor resistance is the sum of the three resistors; in the medium speed or "M" position the speed resistance is that of the resistor 126 and the governor resistance is the sum of the resistors 127 and 128; in the low speed or "L" position of the arm, the speed resistance is the sum of the resistors 126 and 127 and the governor resistance is that of the resistor 128.

Suitable values for the resistors 126, 127, 128 for the motor 17 as described for Fig. 5, would in this case be twenty-five ohms, twenty-five ohms and fifty ohms, respectively.

From the foregoing it will be seen that in providing a testing set of the type described which is of sufficiently small size and weight to make conveniently portable, and in providing a motor driven generator driven at constant but adjustable speeds over a wide range, and in providing for two speed power outlets, a number of problems have been solved and a number of factors coordinated in solving them.

A universal type motor (A. C. and D. C.) must be provided to adapt it to general use; to compensate for variations of line potential which would vary the speed of such a motor, a centrifugal governor controlling the potential on the motor terminals by cutting in and out resistance, is provided; the speed of the motor must be adjustable over a wide range, and this is accomplished by making the governor adjustable; to insure positive operation of the centrifugal governor at all motor speeds including the lowest motor speed, its lowest speed must be high; but this results in a high top speed and the governor then tends to cause fluctuations of the master instrument needle; speed range resistance to adjustably vary and limit the top speed is introduced, and the governor resistance is accordingly made adjustable; since a high speed motor is used for the above purposes, it is made a motor of as high speed as possible within commercial practice to reduce the size and weight for portability purposes; to drive the generator in its normal operating speed range, reduction gearing is introduced, and to provide two-speed power outlets the reduction gearing itself is provided with two-speed power supplying gears.

*Tachometer tests*

As mentioned above, the speed indicating master instrument 108 of Fig. 5 is preferably a standard aircraft electric tachometer instrument and the generator 60 which energizes it and driven by the gear 14 is preferably a standard three phase aircraft tachometer generator. Current conducted from the socket 109 or 110 of Fig.

5 to an electric tachometer on an aircraft will therefore energize the same to indicate speeds throughout its entire range, when supplied with current from the generator 60, driven through a corresponding speed range, exactly the same as it would indicate speeds when supplied with current by its own generator driven by the aircraft engine. Accordingly, the electric tachometer on the aircraft may be tested for accuracy by electrically connecting it to the socket 109 or 110, and operating the motor 17 through a range or ranges of speed as described above, and by comparing the readings on the master instrument 108 with the readings occurring concurrently on the aircraft instrument. The aircraft tachometer is of course first disconnected from its own aircraft electric generator.

This arrangement for making this test is shown diagrammatically in Fig. 10, wherein the aircraft tachometer is shown at T; its own socket at 134, (shown in side elevation); the testing apparatus generally at 135; its socket at 109, (shown here in side elevation); and the testing generator and master instrument at 60 and 108 respectively. At 136 is indicated an interconnecting electric cable or harness having plugs or other type terminals 137 and 138 at its opposite ends connected to the terminals of the sockets 134 and 109.

In some instances it may be desirable to test the electric cable or harness which normally connects the aircraft tachometer to its own generator; and this can be done as indicated in Fig. 10A, after the aircraft tachometer T itself has been found to be accurate, as in Fig. 10.

The aircraft generator for the tachometer T is shown in Fig. 10A at G and as having a socket 139 (shown in side elevation). At 140 is indicated the electric cable or harness comprising a plug or other terminal 141 at one end connected to the generator socket 139, and a terminal 142 at the other end which (for the test of Fig. 10) has been disconnected from the socket 134 of the tachometer T. This generator-to-tachometer harness 140—141—142 is now disconnected from the generator G as a unit, and the terminals 141 and 142 at its ends are connected between the terminals 137 and 134 of Fig. 10, giving the arrangement of Fig. 11. The tachometer test of Fig. 10 is then again repeated to test this harness.

The terminals 141 and 137, Fig. 11, will ordinarily both be plugs (as distinguished from sockets) and some means must be provided to couple them together. This same problem presents itself in great complication in making this and other tests to be described and will be referred to hereinafter.

When the aircraft tachometer to be tested is one mechanically driven by a torsion cable, the torsion cable connecting the aircraft tachometer to the engine is disconnected from the engine and (see Fig. 4) connected to the gear 14 of the testing set by screwing its coupling nut 71 upon the threaded tubular extension 65 of the set. The testing motor 17 may then be operated through its range of speeds and the gear 14 which drives both the generator and the torsion cable will give readings upon the mechanically driven aircraft tachometer and upon the master instrument of the set and their readings may be compared.

Dual tachometer tests

In some cases, the aircraft electrical tachometer is of the dual type comprising two tachometers in a single structure; and it may be desirable to test both simultaneously; or there may be two separate tachometers which it is desired to test simultaneously. This test can be made in several ways with the testing apparatus or set described above.

As shown in Fig. 12, the two sockets 143 and 144 of the aircraft tachometer (or tachometers) T1—T2 are connected by harnesses 145 and 146 each to one of the test set electric outlet sockets 109 and 110 and both energized by the set generator 60 driven throughout a speed range, and simultaneous readings on the tachometers T1 and T2 compared with readings on the master instrument 108.

Or as shown in Fig. 13 as a further inaccuracy-proof test, an accessory generator 69 may be mounted on the set, (the mounting therefor being described above in connection with Fig. 1) and this generator may supply testing current over the harness 146 and the set generator 60 may supply current from the set socket 109 over the harness 145. Both generators 60 and 69 being driven at the same speed, the readings on the master instrument 108 may be compared with the readings on the dual tachometer (or two tachometers) T1—T2.

In some instances it may be desirable to use for this test, the aircraft generator or generators which energize the tachometers T1 and T2 instead of the accessory generator 69 supplied with or as a part of the testing set. In such case one or the other of the aircraft generators is demounted from its engine connection, and put in place of the accessory generator 69 of Fig. 13.

Again, the testing arrangement of Fig. 14 may be utilized. Here the testing harness 146 is connected at one end to the set outlet socket 109; and the other end is connected by a terminal 147 to the socket 144 of one tachometer, for example the tachometer T2 and, by a bridging or jumper harness 148 it is connected also to the socket 143 of the other tachometer T1.

Synchroscope tests

Aircraft are sometimes provided with an instrument or synchroscope for indicating whether two engines are running at the same speed and if not, which one is running the faster, without the necessity of comparing the speeds of their separate tachometers, whereby they may be brought to the same speed when that is wanted. Such synchronism instruments are energized simultaneously by the three phase current from two tachometer generators. To test such an instrument with the present testing set, an accessory standard aircraft tachometer generator 70 (Fig. 1) is mounted on the threaded tubular extension 66. When the motor 17 is operated, it drives this generator 70 at a speed 5% greater than that of the generator 60 of the set. The two aircraft generators which are normally connected to the synchroscope are disconnected therefrom and the generators 70 and 60 are connected to the synchroscope in substitution for them. The synchroscope is thus supplied with currents of two different frequencies and if it is accurate it gives the same indication that it would give if the two aircraft generators to which it is normally connected differed in speed by 5%. The synchroscope thus indicates in one direction. By reversing the connections from one of the testing generators to the synchroscope, it will be caused to indicate in the other direction. Thus any type of synchroscope or synchronism indicating instrument on an aircraft can be tested. This test and the harness connections therefor are shown diagrammatically in Figs. 15 and 16.

In Fig. 15 is shown a typical conventional arrangement of connections when the synchroscope is energized by two generators on an aircraft; the generators being indicated at G1 and G2 and as having respectively three point socket outlets 149 and 150, and the synchroscope being indicated at S and as having a four point receiving socket 151. A harness or multiconductor cable 152 having two suitable three point plug terminals at one end and a four point plug terminal at the other end makes the circuit connections indicated in Fig. 15.

Referring now to Fig. 16, to make the test referred to utilizing the testing set generator 60 and the higher speed accessory generator 70 mounted on the set as described, the normal harness 152 of Fig. 15 is disconnected from the synchroscope and generators by removing its plug terminals therefrom; and a harness 153 between the synchroscope S and the testing set 135 is substituted therefor, as shown in Fig. 16 comprising a set of conductors having a terminal plug connector on one end for making four point connection with the synchroscope socket 151, and two terminal plug connectors on the other end for making connection with the outlet socket 154 of the accessory generator 70 (higher speed) and connection with the outlet socket 109 of the testing set generator 60 (lower speed).

This test of the same synchroscope can be made another way, as indicated in Fig. 17. The accessory generator here 69 is mounted on the threaded extension 65 as shown in dotted line in Fig. 1. Both generators at the testing set will therefore have their rotors driven at the same speed. The electrical harness interconnections will be the same as in Fig. 16.

The external generator housing which supports the stator of the accessory generator 69, see Fig. 1, is now grasped manually and rotated in one direction on its mounting threads on the extension 65. This will cause the relative rotational speed of its rotor and stator to be different from that of the generator 60, and will cause the frequencies of the two generators to be different. The frequency of the accessory generator current will be the greater when the stator is rotated in one direction and the lesser when rotated in the other direction. Thus when the said stator is rotated manually in one direction, the synchroscope will indicate on one side of zero; when rotation of the stator is stopped it will indicate zero; and when it is rotated in the other direction, the synchroscope will indicate at the other side of zero; and the aforesaid reversal of the electrical interconnections is unnecessary to cause it to read in both directions.

In some cases, the synchroscope of an aircraft is connected to two tachometers (or to a dual tachometer) and energized by current supplied to the tachometers. In Fig. 18 is shown an illustrative example. The two generators G1 and G2 have three point outlet sockets 155 and 156. The two tachometers T1 and T2 have three point receiving sockets 157 and 158. The synchroscope S has a four point receiving socket 159. A harness 160 having a suitable plug connector on each end, connects the points of the generator socket 155 with the points of the tachometer socket 157; and a harness 161 with plugs on each end connects the points of the socket 156 with the points of the socket 158. A multiconductor harness 162 is connected at one end to the points of the tachometer sockets 157 and 158, and at the other end has a plug for making connection with the points of the synchroscope socket 159.

To test the synchroscope S, the harness 162 may be disconnected from the synchroscope by removing the harness plug terminal from the socket 159, and the plug terminal on the left end of the harness 153 of Fig. 16 or of Fig. 17 may be substituted therefor, and the test made as described for Figs. 16 or 17.

Or, both the synchroscope S and the two tachometers T1 and T2 can be tested as indicated in Fig. 19. The harnesses 160 and 161 of Fig. 18 are removed.

Then as shown in Fig. 19, a test harness 163 having three point terminals at each end connects the socket 157 of tachometer T1 to the testing set socket 109; and a similar test harness 164 connects the socket 158 of the tachometer T2 to the socket 154 of the generator 69. The rotors of both generators are normally driven at the same speed, and both tachometers T1 and T2 if accurate indicate the same speed, which may be compared with the speed indication on the master instrument 108; and the synschroscope S if accurate indicates zero. The stator of the generator 69 is then rotated manually in one direction or the other as described above. This will cause one tachometer T1 or T2 to indicate higher or lower speed than the other, and will cause the synchroscope S to indicate at one side or the other of zero.

*Testing generators and their harnesses*

In some instances, and with reference to the testing diagrams, Figs. 10 to 19, it may be desirable to test the generators G, or G1 and G2, and the harnesses which supply their energizing current to the tachometer T, or T1 and T2, or to the synchroscope S. It was described in connection with Figs. 10 to 11 how the harness between the generator G and the tachometer T could be tested. A similar test could be made of the harness between the two generators on the aircraft supplying current to the two tachometers T1 and T2 as in Figs. 12 and 13.

To test any generator, the arrangement indicated in Fig. 20 may be utilized. The generator G is demounted from its engine connection and mounted upon the testing set on the tubular extension 65 of Fig. 1 in the place indicated for the generator 69, and an accessory instrument 165 is provided. It may be for example a tachometer Ta. The output socket 166 of the generator is connected to the input socket 167 of the tachometer by an accessory harness 168 having suitable terminals at its end for connecting to the points of the sockets. The accessory instrument Ta, and the testing set instrument 108 being known to be accurate, then if the generator G is without fault, the indications on the accessory tachometer Ta for different speeds of the generator G will be the same as those on the testing set tachometer 108. By this test any generator can be tested.

To test the harnesses connecting generators to synchroscopes, for example the harness 152 of Fig. 15 or the harnesses 160 and 161 of Fig. 18, the following procedure may be used with reference to Fig. 21. An accessory generator 69 is mounted on the testing set as described and an accessory synchroscope Sa shown at 165A is provided. To test the harness 152 of Fig. 15, it is disconnected from the aircraft synchroscope and generators G1 and G2, and one end is connected by its terminal to the receiving socket 169 of the accessory synchroscope 165A and the other end is connected by its terminals respectively to the supplying socket 170 of the generator 69 and to the testing set supplying socket 109. The stator of the generator 69 is then rotated in one direction or the other and if the accessory synchroscope Sa indicates correctly, the harness will thereby be shown to be without fault.

Similarly to test the harness 162 of Fig. 18 the same procedure may be followed.

To test the harnesses 160 or 161 of Fig. 18 the procedure described for testing the harness 168 of Fig. 20 may be followed.

Testing other types of instruments

Besides instruments such as tachometers that respond to three phase alternating current of varying frequency, independently of potential, there are in use instruments energized by alternating current and responding to varying potential.

Such varying potential is commonly single phase supplied by a driven single phase electric generator driven at variable speed, and the instrument energized thereby indicates the speed of the generator or a speed proportional thereto.

It is believed that the following brief description will be sufficient to show how the above described testing set would be used to test such instruments.

The motor 17 would be driven at variable speed and drive the generator 60 and the shaft 67, and their speed would be indicated on the master instrument 108. A standard aircraft single phase accessory generator would be mounted in place of the generator 69 and driven at this same variable speed. Current from the accessory generator would be conducted to the instrument to energize it, in proportion to the speed of the accessory generator which is indicated on the master instrument 108 and its speed indications compared with those on the master instrument.

If preferred, an accessory master instrument not shown of the single phase type could be used at the set connected to an energized by the accessory single phase generator 69, to indicate speeds of the generator and for comparison with indicated speeds on the aircraft instrument.

Testing cable-driven synchroscopes

If the synchroscope to be tested is one mechanically driven by torsion cables, it can be tested by connecting one cable to the stub-shaft 8 Fig. 1 and the other cable to the stub-shaft 6; and they will then be driven at the speed difference of five per cent at all speeds of the motor 17 as will be understood and the synchroscope if correct will indicate in one direction. By interchanging the cables on the stub-shafts, it will indicate in the other direction.

Testing set harness

From the foregoing it will be seen that to perform all of the desirable tests on generators, single tachometers, dual tachometers, or two tachometers concurrently, synchroscopes, etc., the testing set sometimes will drive its own generator 60 along and supply three-phase current from one or the other or both of the three-point outlet sockets 109 and 110; and at other times will drive concurrently an accessory generator having an outlet three-point socket; and that the accessory generator may in some cases be a generator demounted from the airplane engine and mounted upon the set; and that, for example in the tests of Figs. 10 and 14 inclusive, the three-point outlet connection of the testing set is sometimes connected to a three-point current receiving socket, whereas for example in the tests of Figs. 16, 17, 19 and 21, it is connected to a four-point socket; and whereas in some instances the output socket of the accessory generator, as for example in Figs. 16 and 17 may supply current over two wires from its three-point outlet socket, the current may be delivered to a four-point receiving socket, whereas as in Fig. 19 all three of its outlet points may be connected to three input points; and as in Fig. 14 it is sometimes desirable to provide a jumper type of interconnection 148 between two three-point terminals.

It follows that a testing apparatus such as described above would have to be equipped with a great variety of interconnecting conductor harnesses to make all of the tests of which the apparatus is capable. And while this requirement leads to complications in the number and variety of such interconnecting harnesses, these complications are enormously multiplied by the fact that, although the current delivering sockets of aircraft generators and the current receiving sockets of aircraft instruments have been to a degree standardized, there is nevertheless in use a great variety of such sockets, and correspondingly a great variety of plug terminals mating therewith.

To name a few, there are socket receptacles of the three pin or male type; and there are sockets of this type in which one of the pins is grounded; and there are sockets of this type in which the surrounding metal part associated with the pin is grounded; and there are sockets with two male pins, and sockets of this type in which the surrounding metal part is grounded; and there are sockets of the four-pin type and sockets of this type in which one pin is grounded. Also, there are sockets of all of the aforementioned types in which instead of male pins they have female sleeves or tubes.

Also, in each of the above described types, the socket as a whole is provided with external threads by which the plug and socket are connected they are secured together by an external coupling nut; but there are also others in which the threads are internal and the socket and plug are secured by an internal nut.

Obviously a testing set such as that described above in order to make all of the tests of which it is capable must be provided with harnesses capable of making any desired inter-connection between any two types and kinds of sockets or plug terminals and to be able to effect a jumper connection from one to another, whether three-wire, two-wire, or four-wire, grounded or not grounded. Furthermore, in some cases the connection has to be made in duplicate.

The obvious construction of inter-connecting harness for making any test would be a harness consisting of the requisite number of conductors for that test and having, on its opposite ends, terminal connectors for engaging the receptacles between which it is to be connected; but to provide such harness equipment would be utterly impracticable and render the testing apparatus useless in the practical sense, because of the enormous number of such interconnecting harnesses that would be necessary. It is not known exactly how many would be needed but it has been estimated that the number is greater than 200. And even if all of the necessary interconnecting harnesses of this obvious type, were supplied with testing apparatus, and at the corresponding prohibitive expense the mere task of selecting from such a large number the particular one applicable to any test, and its duplicate in some cases, would be entirely outside the range of practicability.

Nor would this problem of complication be solved by providing one kind of harness and one kind of terminal on its ends, and adapters to adapt these end terminals to the sockets with which they were to be used, because then there would be several hundred adapters from which to select the requisite pair, and this would be equally expensive and impracticable.

This problem of harness complications will become apparent to those undertaking to practice the various tests disclosed herein and may appear to render them impracticable; and it is therefore here stated that the solution to the problem was set forth as a part of the foregoing when the application was filed, and was later taken out and is the subject matter of the patent to Francis E. Knam, Number 2,460,830, issued February 8, 1949 and attention is directed thereto.

Bench tests

While the above description of the invention refers its application particularly to the testing of aircraft instruments in the aircraft, it will be apparent that it can be similarly used to make bench tests of instruments that have been removed from the aircraft; or to make inspection tests of instruments at the time of manufacture and before they are installed in an aircraft; and in fact the testing of demounted tachometer generators has already been illustrated and described.

But there are other bench tests of instruments to which the apparatus is applicable with particular advantages; among which are the important tests of instruments which indicate the attitude of the aircraft in flight, of which may be mentioned bank indicators, pitch indicators, etc. These instruments are commonly tested by mounting them on a table having rotative or nutative movement sometimes referred to as a Scorsby table. The testing table must be power driven about an axis at accurate, known, adjustable speeds.

It has been illustrated and described herein in connection with Figs. 1, 4, and 5 how a torsion cable 73 may be connected at one end to the power unit 1 to be driven by the shaft 8 at constant but adjustably variable speed, and the speed indicated on the master instrument 108, the other end of the cable being connected to a mechanically driven tachometer.

To drive a Scorsby or like instrument testing table, by the apparatus herein described, the other end of such a cable would be drivingly connected to the table as its source of motive power, and the revolutions per minute of the table would correspond or have a direct constant ratio to the rotations per minute of the cable as the latter are indicated on the master instrument 108.

A particular embodiment of the invention has been set forth in the foregoing, some of the parts being shown and described in detail; but it will be apparent to those skilled in the art that changes and modifications may be made without departing from the spirit of the invention or sacrificing its advantages; and the invention comprises all modifications and changes which come within the scope of the appended claim.

I claim:

The method of testing an aircraft synchroscope or like instrument of the type which responds to two electric currents of different frequency, which includes: connecting the output terminals of two alternating current electric generators to the instrument to energize it, driving the rotors of both electric generators concurrently at a preselected speed, and manually rotating the stator of one generator in one direction or the other while its rotor is being driven, to increase or decrease its frequency relative to that of the other generator.

CARL F. DUERR, Jr.

REFERENCES CITED

The following references are of record in the file of this patent:

UNITED STATES PATENTS

| Number | Name | Date |
| --- | --- | --- |
| 1,574,297 | Lilleburgh | Feb. 23, 1926 |
| 1,748,417 | Haskins | Feb. 25, 1930 |
| 2,102,185 | Morgan et al. | Dec. 14, 1937 |
| 2,166,420 | Robertson | July 18, 1939 |
| 2,322,114 | Clare et al. | June 15, 1943 |

OTHER REFERENCES

Article by Ballard et al. in Electrical Engineering Transactions, September 1944, pages 646–648.